June 9, 1953          G. E. WISE          2,641,080
FISH LURE
Filed June 17, 1949
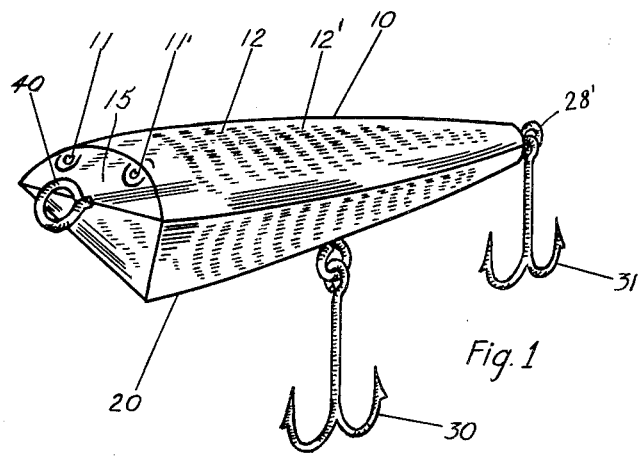
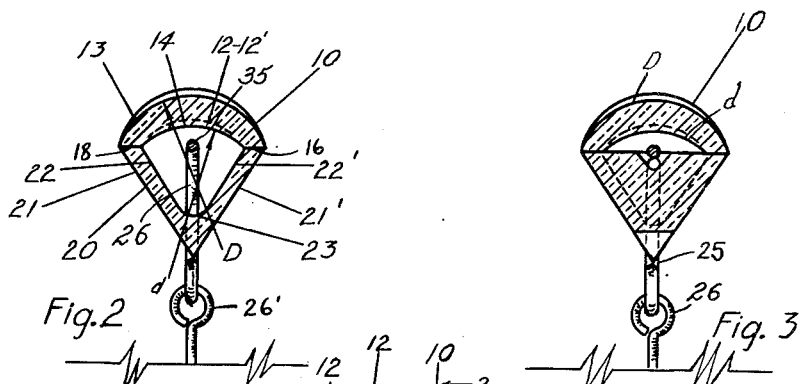 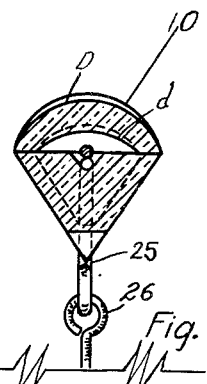
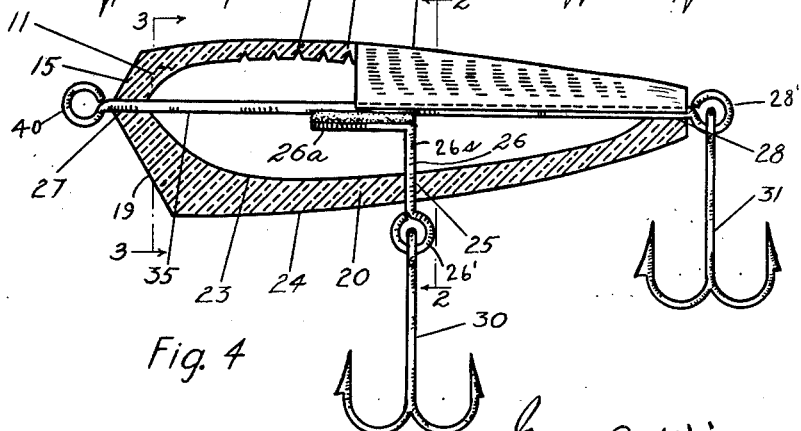
Gary E. Wise, INVENTOR.
BY Slough & Slough
His Attorneys Patented June 9, 1953

2,641,080

UNITED STATES PATENT OFFICE 2,641,080

FISH LURE

Gary E. Wise, Cleveland, Ohio, assignor to Holdenline Company, Cleveland, Ohio, a corporation of Ohio Application June 17, 1949, Serial No. 99,759

1 Claim. (Cl. 43—42.36)

My invention relates to an improved fish lure and relates more particularly to lures of the type molded from plastic composition which is transparent or semi-transparent.

My invention further relates to an improved method of constructing a fish lure of said plastic or like material.

My first invention further utilizes the principle of refraction in acrylic plastic materials to achieve a refraction of fish lure markings whereby the attention of game fish is attracted.

In my present invention, I preferably form the lure in two parts, the upper section being a curved portion, and the lower section of the lure being generally prismatic in form. Depressions, similar to those utilised in my copending application, Serial No. 98,006 filed June 9, 1949 of which this application is a continuation in part, are preferably employed herein.

An object of my invention is to provide an improved fish lure wherein various interior markings and colourings are refracted, with varying effects, through a smooth exterior surface of a lure.

Another object of my invention is to so form the exterior and interior of the lure that the effects of a condensing lens are obtained through control of the relative radii of the outer and inner arc surfaces of the upper lure body, and depressions therein are refracted through a prismatically formed bottom member so that the markings in the upper member are apparently duplicated in combined form in viewing the faces of the prismatically formed bottom member, thus giving the illusion of apparent life-like motion to the lure.

Other objects of my invention and the invention itself will become increasingly apparent by reference to the following description and to the drawings, in which drawings:

Fig. 1 is a perspective view of the improved fish lure of my invention;

Fig. 2 is a cross sectional view taken on the line 2—2 of Fig. 4;

Fig. 3 is a cross-sectional view taken on the line 3—3 of Fig. 4;

Fig. 4 is a partial longitudinal sectional view of the lure of Fig. 1.

Referring now to the figures of the drawing, in all of which like parts are designated by like reference characters, the improved lure of my invention is preferably constructed of a pair of body sections 10 and 20, both sections being formed preferably of an acrylic plastic material, or like transparent material.

The upper portion 10 is formed with a curved exterior surface 13 and an internal curved surface 14, the exterior or external and internal surfaces of the curved upper portion 10 forming a converging meniscus. The thickness of the upper portion is relatively less upon its sides than at its median portion. The said upper portion is provided with a face or head portion 15 in a plane preferably 60° to the longitudinal axis of the lure in which intaglio markings 11—11' simulating fish eyes are positioned.

The lower portion of the lure is generally V-shaped in form. The forward end 19 of the lure portion is preferably also disposed at an angle of approximately 60° to the longitudinal axis of the lure and the under surface of said lower portion is generally rearwardly curved upwardly from the forward to the rearmost portion of the lure. Similarly, the upper portion is generally curved downwardly, tapering towards the rearmost portion of the lure, whereby the lure is considerably wider at its forward edge than at its rearward edge, and the lure approximates a fish-like form.

The bottom portion of the lure 20 is provided with substantially flat upper surfaces 18, of the same width as the lower joining surfaces 16 of the upper portion of the lure, where fore jointure may be made between the two sections. The under surface 14 of the curved upper portion of the lure is provided with depressions 12—12' and the internal surface, having a curved surface as above described, approximating the arc of a circle whose diameter is "d," cooperates with the external surface 13 to produce the effect of a condensing lens, thus effecting magnification of the markings 12—12' in said upper surface.

The lower substantially V-shaped portion is provided with relatively smooth outer faces 21—21' disposed at angles to the longitudinal axis of the lure, and the inner surfaces 22—22' of the said bottom portion 20 are curved to a meeting bottom fillet 23, wherefore the markings 12—12' are refracted through the plane surfaces 21—21' to create the illusion of the markings being on both these faces of the triangle and in magnified form. It will be noted that the bottom of the fillet 23 follows a contour which is substantially concurrent with the edge 24 of the body, as best shown in Figs. 3 and 4.

The markings 12—12' are preferably V-shaped depressions and color is applied thereto as by staining, tinting, foil insertions or the like. The eyes 11—11' are semi-circular concave intaglio and similarly preferably colored.

An aperture 25 is disposed centrally of the lure body section 20 and a fastener 26, carrying an eyelet 26', is disposed through said aperture 25, and to said eyelet 26 a fish hook 30 is secured and positively located therein.

Apertures 27 and 28 are provided when the body 10 is attached, by cementing, to the body 20, half of each aperture being disposed in the upper body portion and the remainder in the lower body portion. A line fastening rod is disposed centrally and longitudinally through said lure and the ends thereof projected through the said apertures 27 and 28. The rod terminates forwardly of the lure in an eye hook 40 and rearwardly of the lure in an eye hook 28'. The hook fastening device 26 is provided with an arm 26a disposed at right angles to and forwardly of the stem 26s which is preferably secured to the rod 35 as by soldering or the like.

A fish hook 31 is secured to the rear eye hook 28' and a lead line to the forward eye hook 40. The upper member of the body 10, by reason of its cementing to the lower body portion, is so secured to the lower body member that the interior of the lure, which is hollow, is hermetically sealed. The lower body portion 20 of the lure of my invention may carry depressions or other markings therein or may be smooth, as shown, and merely acts to refract markings in the upper body.

Although I have described my invention in connection with a preferred embodiment, I am aware that numerous and extensive departures may be made therefrom without, however, departing from the spirit of my invention and the scope of the appended claim.

I claim:

A fish lure including a body and hooks, said body comprising a curved upper portion having a substantially smooth external surface, the internal surface of said portion having depressions and the external and internal surfaces forming a converging meniscus, and a lower portion having walls forming a V-shape in cross section and prismatically formed and generally hollow, said upper and lower portions of the body having means therebetween to hermetically seal the joint between the portions, a rod extending lengthwise through the body and located between the portions and having securing means at the end thereof, one of said securing means being adapted to engage a line and the other to engage a hook.

GARY E. WISE.

References Cited in the file of this patent

UNITED STATES PATENTS

| Number | Name | Date |
|---|---|---|
| 1,273,573 | Brilhart | July 23, 1918 |
| 1,892,892 | Jamar, Jr. | Jan. 3, 1933 |
| 2,123,951 | McArthur | July 19, 1938 |
| 2,127,761 | Beck | Aug. 23, 1938 |
| 2,163,666 | Carter et al. | June 27, 1939 |
| 2,582,646 | Moore | Jan. 15, 1952 |